(12) United States Patent
Yamamoto

(10) Patent No.: US 7,754,161 B2
(45) Date of Patent: Jul. 13, 2010

(54) REACTOR TO REFORM FUEL, INCLUDING A LOW TEMPERATURE REACTION UNIT, A HIGH TEMPERATURE REACTION UNIT, AND A COMMUNICATING TUBE VIA WHICH THE LOW AND HIGH TEMPERATURE REACTION UNITS COMMUNICATE WITH EACH OTHER

(75) Inventor: Tadao Yamamoto, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 880 days.

(21) Appl. No.: 11/447,316

(22) Filed: Jun. 5, 2006

(65) Prior Publication Data

US 2006/0277827 A1    Dec. 14, 2006

(30) Foreign Application Priority Data

Jun. 9, 2005    (JP)    ............................. 2005-169188

(51) Int. Cl.
*B01J 8/00*    (2006.01)
(52) U.S. Cl. ....................... 422/189; 48/127.9; 422/211
(58) Field of Classification Search ................ 48/127.9; 422/211
See application file for complete search history.

(56) References Cited

U.S. PATENT DOCUMENTS 6,159,434 A    12/2000    Gonjo et al.
6,569,553 B1    5/2003    Koripella
2004/0244290 A1    12/2004    Yamamoto et al.
2005/0193628 A1    9/2005    Kim

FOREIGN PATENT DOCUMENTS

EP    0861802 A2    9/1998

(Continued)

OTHER PUBLICATIONS

Japanese Office Action (and English translation thereof) dated Sep. 16, 2008, issued in a counterpart Japanese Application.

(Continued)

*Primary Examiner*—Alexa D Neckel
*Assistant Examiner*—Imran Akram
(74) *Attorney, Agent, or Firm*—Frishauf, Holtz, Goodman & Chick, P.C.

(57) ABSTRACT

A reactor to reform fuel includes a low temperature reaction unit, a high temperature reaction unit provided separately from the low temperature reaction unit, and a communicating tube via which the low temperature reaction unit and the high temperature reaction unit communicate with each other. At least one of the low temperature reaction unit and the high temperature reaction unit has a first surface, and the other of the low temperature reaction unit and the high temperature reaction unit has a second surface which is opposed to the first surface. The first surface includes a concave surface and a projecting surface which projects towards the second surface, wherein a length between the concave surface and the second surface is longer than a length between the projecting surface and the second surface. And the communicating tube is provided between the concave surface and the second surface.

12 Claims, 6 Drawing Sheets

FOREIGN PATENT DOCUMENTS

| | | |
|---|---|---|
| EP | 0887307 A1 | 12/1998 |
| EP | 1571124 A1 | 9/2005 |
| JP | 10-236802 A | 9/1998 |
| JP | 2002-356310 A | 12/2002 |
| JP | 2003-300703 A | 10/2003 |
| JP | 2004-217448 A | 8/2004 |
| JP | 2004-303695 A | 10/2004 |

OTHER PUBLICATIONS

Japanese Office Action dated Jan. 6, 2009 (2 pages), and English translation thereof (5 pages) issued in counterpart Japanese Application No. 2005-169188.

Korean Office Action dated Mar. 30, 2009 (3 pages), and English translation thereof (2 pages), issued in counterpart Korean Application Serial No. 10-2007-7021290.

International Preliminary Report on Patentability, Chapter I of the Patent Cooperation Treaty, and Written Opinion for PCT/JP2006/311029, dated Dec. 27, 2007. 7 sheets.

REACTOR TO REFORM FUEL, INCLUDING A LOW TEMPERATURE REACTION UNIT, A HIGH TEMPERATURE REACTION UNIT, AND A COMMUNICATING TUBE VIA WHICH THE LOW AND HIGH TEMPERATURE REACTION UNITS COMMUNICATE WITH EACH OTHER

BACKGROUND OF THE INVENTION

1. Field of the Invention

The present invention relates to a reactor integrating reaction device having different operating temperatures such as a vaporizer, a reformer, a CO remover and the like, each used for a fuel cell device.

2. Description of Related Art

In recent years, it has begun to apply a fuel cell using hydrogen as a fuel to motorcars, portable equipment and the like as a clean power source having a high energy conversion efficiency. The fuel cell is a device of directly taking out electric energy from chemical energy by electrochemically reacting a fuel with atmospheric oxygen.

Although hydrogen can be listed as a fuel used for the fuel cell, it has a problem of handling and storing owing to being a gas at a room temperature. In case of using a liquid fuel such as alcohols and gasoline, a vaporizer to vaporize the liquid fuel, a reformer to extract hydrogen required for electric power generation by reacting the liquid fuel with high temperature steam, a CO remover to remove carbon monoxide, which is a by-product of a reforming reaction (for example, refer to JP-2002-356310A).

In a reactor equipped with a vaporizer, a reformer and a CO remover, in order to install the fuel cell in a small electronic device, there is a temperature difference between the proper operating temperature of the vaporizer and the CO remover, which is about 200° C. or less, and the proper operating temperature of the reformer which is about 250° C. or more. Accordingly, in order not to raise the temperatures of the vaporizer and the CO remover over the operating temperature range owing to the propagation of the heat of the reformer, these relatively low temperature reaction furnaces are required to separate from the relatively high temperature reaction furnace, i.e., the reformer, by a sufficiently long distance. However, such a long distance separation has been a miniaturization constraint for the whole reactor. If the miniaturized installation is impossible for such a reason, then heat capacity becomes excessively large, and it is necessary to decrease the heat loss of the whole reactor for improving the energy efficiency.

SUMMARY OF THE INVENTION

It is an advantage of the present invention to provide a reactor which suppresses heat loss and causes a chemical reaction at a proper temperature.

In order to solve the above described problem, according to a first aspect of the invention, the reactor to reform fuel, includes: a low temperature reaction unit which causes a reaction at a predetermined temperature; a high temperature reaction unit which causes a reaction at a higher temperature than the low temperature reaction unit, the high temperature reaction unit being provided separately from the low temperature reaction unit; and a communicating tube via which the low temperature reaction unit and the high temperature reaction unit communicate with each other, wherein at least one the low temperature reaction unit and the high temperature reaction unit has a first surface, and the other of the low temperature reaction unit and the high temperature reaction unit has a second surface which is opposed to the first surface; wherein the first surface includes a concave surface and a projecting surface which projects toward the second surface, and a length between the concave surface and the second surface is longer than a length between the projecting surface and the second surface; and wherein the communicating tube is provided between the concave surface and the second surface.

In the reactor according to the first aspect of the invention, the low temperature reaction unit may include a CO remover or a vaporizer.

The high temperature reaction unit may include a reformer to reform the fuel into hydrogen.

The low temperature reaction unit or the high temperature reaction unit may include a heater.

The reactor may further comprise a heat insulating package to house the low temperature reaction unit, the high temperature reaction unit and the communicating tube therein.

The low temperature reaction unit or the high temperature reaction unit may be formed of a plurality of metal substrates.

In order to minimize the strain at the connecting portion of the communicating tube caused by heat expansion when the low temperature reaction unit or the high temperature reaction unit is heated, preferably, the low temperature reaction unit, the high temperature reaction unit and the communicating tube are formed of the same material.

The low temperature reaction unit may include a CO remover; the high temperature reaction unit may include a reformer reforming the fuel into hydrogen; and the communicating tube may include a piping to circulate a gas reformed by the reformer into the CO remover.

The high temperature reaction unit may include a combustor to combust a combustible gas to generate heat, and the communicating tube may include a piping to circulate the combustible gas from the low temperature reaction unit into the combustor.

The low temperature reaction unit may include an assembly piping.

The above described reactor may be applied to a power generation apparatus equipped with a fuel cell.

According to the first aspect of the invention, the distance of the communicating tube is lengthened. Thereby, the heat transfer from the high temperature reaction unit to the low temperature reaction unit can be suppressed, and the distance between the low temperature reaction unit and the high temperature reaction unit can be shortened to make the miniaturization possible.

In accordance with a second aspect of the invention, the reactor to reform fuel, comprises: a low temperature reaction unit causing a reaction at a predetermined temperature; a high temperature reaction unit causing a reaction at a higher temperature in comparison with that of the low temperature reaction unit; and a communicating tube making the low temperature reaction unit and the high temperature reaction unit communicate with each other, wherein at least one of the low temperature reaction unit and the high temperature reaction unit is formed of a plurality of metallic plates.

According to the second aspect of the invention, at least one of the low temperature reaction unit and the high temperature reaction unit is formed of a metallic plate. As a result, the metallic plate is superior in heat conductance to a glass substrate, and the reactor can be worked to be thin. Thereby, the miniaturization can be realized, and the heat capacity becomes small simultaneously. Consequently, a chemical reaction can be caused at a proper temperature by a small heat quantity.

In accordance with a third aspect of the invention, the reactor to reform a fuel, comprises: a low temperature reaction unit causing a reaction at a predetermined temperature; an incurrent canal provided in the low temperature reaction unit; an excurrent canal provided so as to touch to the incurrent canal; a high temperature reaction unit causing a reaction at a higher temperature in comparison with that of the low temperatures reaction unit; and a communicating tube making the low temperature reaction unit and the high temperature reaction unit communicate with each other.

According to the third aspect of the invention, because the incurrent canal and the excurrent canal are provided so that they may touch each other, the fluid heated by the heat of the low temperature portion heats the fluid flowing into the excurrent canal when the fluid flows out through the excurrent canal. Thereby, heat exchange is enabled, and the decrease of the heat quantity for heating the fluid which has been heated in the incurrent canal in advance in the low temperature reaction unit. Consequently, the chemical reaction can be caused at a proper temperature.

According to the present invention, a chemical reaction can be caused at a proper temperature.

DETAILED DESCRIPTION OF THE PREFERRED EMBODIMENTS

In the following, the best mode for implementing the present invention is described with reference to the attached drawings. However, although technically preferable various limitations for implementing the present invention are given to the embodiment described below, the limitations do not limit the range of the invention to the following embodiments and illustrated examples.

First Embodiment

Figure 1:
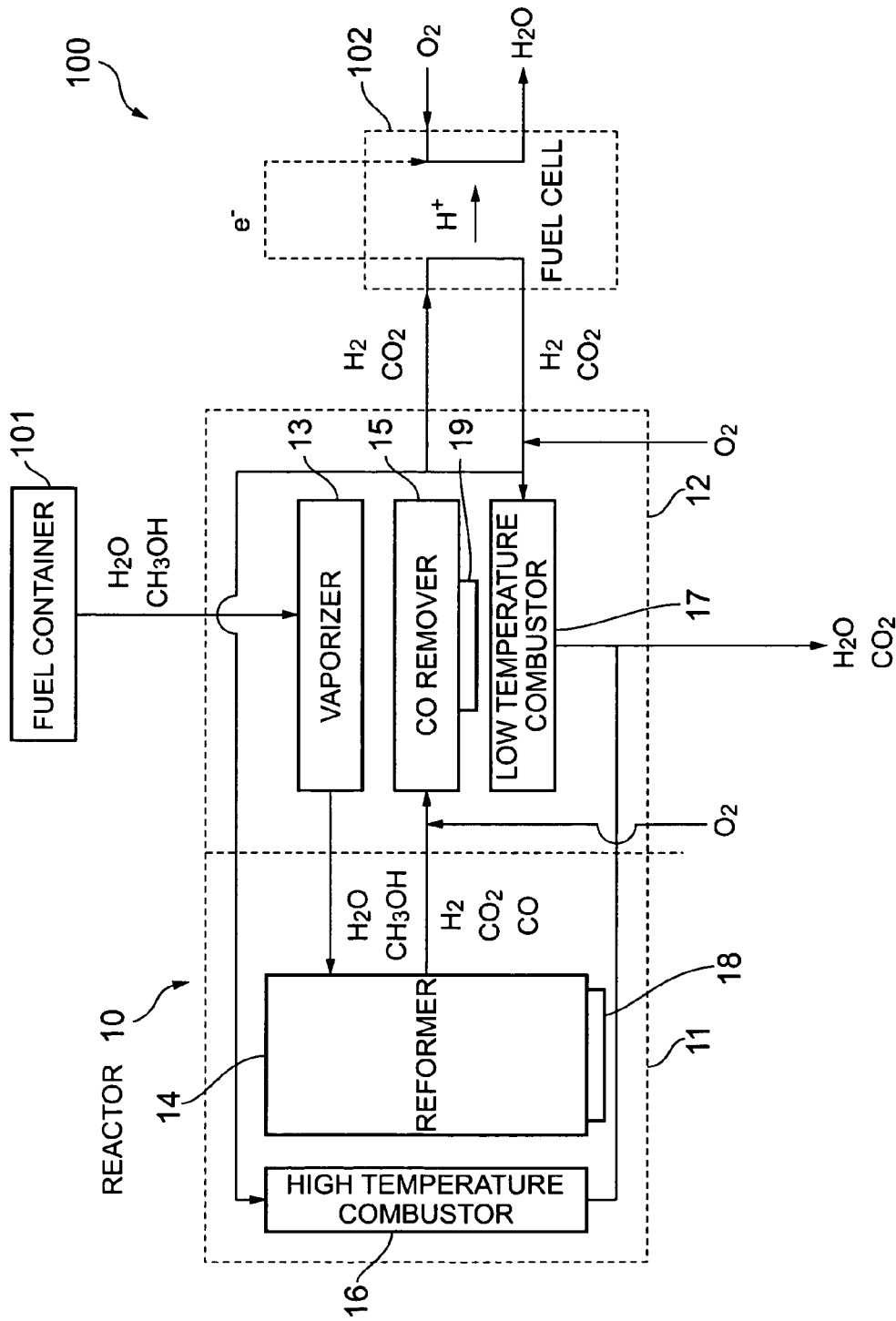
FIG. 1 is a block diagram of a power generation apparatus 100.

FIG. 1 is a block diagram of a power generation apparatus 100 to which a reactor 10 according to a first embodiment of the present invention is applied. The power generation apparatus 100 is installed in a notebook-size personal computer, a portable telephone, a Personal Digital Assistant (PDA), an electronic notebook, a wrist watch, a digital still camera, a digital video camera, game equipment, a play machine and the other electric equipment, and is used as a power source for operating the main body of electronic equipment.

The power generation apparatus 100 is composed of a fuel container 101, the reactor 10, which is freely connectable with the fuel container 101 and includes a reaction furnace reforming the fuel supplied from the fuel container 101, and a fuel cell device 102 generating electric power with the hydrogen reformed by the reactor 10. The fuel container 101 may reserves the fuel, such as methanol and the like, and water in the state of being mixed with each other or of being separated from each other to supply the mixed liquid of the fuel and the water with a not shown micro-pump. Alternatively, the fuel and the water may be mixed with each other in the fuel container in advance.

Figure 2:
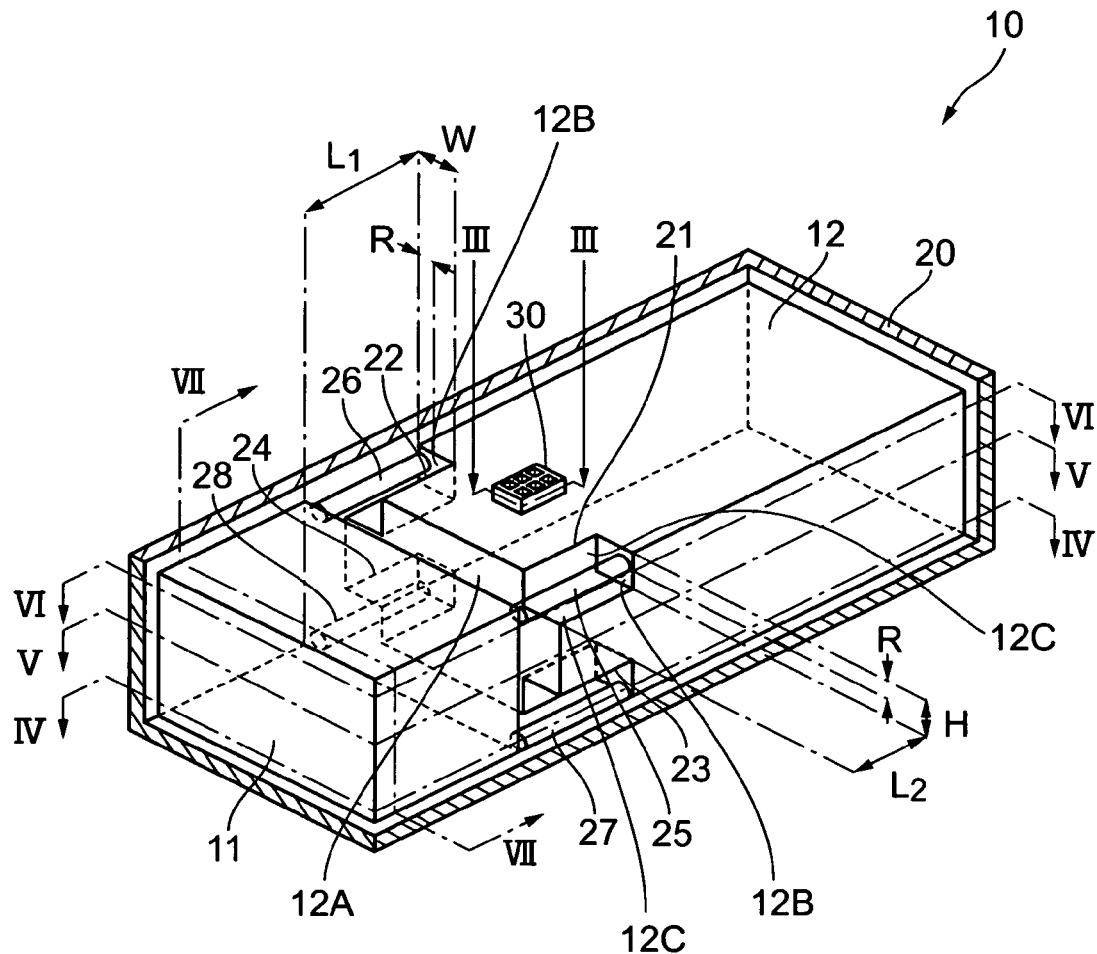
FIG. 2 is a perspective view of a reactor 10.

FIG. 2 is a perspective view showing the state of the reactor 10 viewed from the under side. The reactor 10 is composed of a high temperature reaction unit 11 and a low temperature reaction unit 12 disposed to be opposed to the high temperature reaction unit 11 as shown in FIG. 2. The high temperature reaction unit 11 is a reaction unit causing a reaction exceeding 200° C. The high temperature reaction unit 11 includes a reformer 14 causing a steam reforming reaction generating hydrogen by reforming the fuel in the fuel container 101, a high temperature combustor 16 heating the reformer 14 to a high temperature in order to accelerate the reform reaction of the reformer 14, and a high temperature heater 18, which is an electric heat element used as an auxiliary heat source for heating the reformer 14 rapidly even in a state in which the high temperature combustor 16 cannot heat to a high temperature especially like at the time of a start of the power generation apparatus 100.

The low temperature reaction unit 12 is a reaction unit causing a reaction under 200° C. The low temperature reaction unit 12 includes a vaporizer 13, which is a reaction furnace vaporizing the fuel and the water to be supplied to the reformer 14 in advance, a CO remover 15, which is a reaction furnace removing carbon dioxide produced as a by-product at the time of reforming in the reformer 14, a low temperature combustor 17 used as a heat source of a relatively low temperature necessary for the reaction in the CO remover 15 and the vaporization reaction in the vaporizer 13, and a low temperature heater 19, which is an electric heat element used as an auxiliary heat source for heating the vaporizer 13 and the CO remover 15 rapidly even in a state in which the low temperature combustor 17 cannot perform heating sufficiently like at the time of a start of the power generation apparatus 100 especially.

Any of the high temperature reaction unit 11 and the low temperature reaction unit 12 are formed by pasting a plurality of metallic plates with each other, which is made of, for example, a stainless (SUS 304) on which a flow path, which will be described later, is formed. Consequently, the high temperature heater 18 is pasted to the metallic plate of the reformer 14 with an insulation film between them, and the low temperature film 19 is pasted to the metallic plate of the CO remover 15 or the metallic plate of the low temperature combustor 17 with an insulation film between them.

The vaporizer 13 is a reaction furnace vaporizing the fuel and the water supplied from the fuel container 101. The reformer 14 reacts the gaseous mixture of the fuel and the water supplied from the vaporizer 13 in accordance with a chemical reaction formula (1) to generate a gaseous mixture containing hydrogen gas and carbon dioxide gas, which are the main products, and carbon monoxide, which is a by-product. The reformer 14 also partially causes a reaction in accordance with a chemical reaction formula (2) to generate an infinitesimal carbon monoxide. The CO remover 15 selectively oxidizes the carbon monoxide generated by the reformer 14 in accordance with a chemical reaction formula (3) to remove the carbon monoxide from the gaseous mixture. In the following, the hydrogen-rich gaseous mixture after the removal of the carbon monoxide is referred to as a reformed gas. In addition, although the chemical reaction formula (3) is an exothermic reaction, it is possible to improve the reaction speed by heating at the start of the reaction.

$$CH_3OH + H_2O \rightarrow 3H_2 + CO_2 \quad (1)$$

$$H_2 + CO_2 \rightarrow H_2O + CO \quad (2)$$

$$2CO + O_2 \rightarrow 2CO_2 \quad (3)$$

The reformed gas is supplied from the reactor 10 to the fuel electrode side of the fuel cell device 102. The hydrogen gas in the reformed gas is separated into hydrogen ions and electrons with a catalyst provided on the fuel electrode as shown in an electrochemical reaction formula (4). The hydrogen ions pass through the electrolyte film of the fuel cell device 102 to move to an oxygen electrode side. The electrons move to the oxygen electrode through an external circuit. On the oxygen electrode side, as shown in an electrochemical formula (5), water is generated by a chemical reaction of the hydrogen ions which have passed through the electrolyte film, the electrons supplied from the oxygen electrode through the external circuit, and oxygen gas supplied from the open air. Electric energy can be taken out from the difference of the electrode potential of the fuel electrode and the oxygen electrode.

$$H_2 \rightarrow 2H^+ + 2e^- \quad (4)$$

$$2H^+ + 2e^+ + \tfrac{1}{2}O_2 \rightarrow H_2O \quad (5)$$

The high temperature combustor 16 mixes oxygen into the remaining hydrogen gas which has not performed the electrochemical reaction mentioned above (hereinafter referred to as off-gas) in the reformed gas supplied to the fuel electrode side, and burn the gas to heat the high temperature reaction unit 11 to a temperature of 250° C. or more, e.g. within a range of from about 250° C. to 400° C. Similarly to the high temperature combustor 16, the low temperature combustor 17 mixes oxygen into a part of the off-gas, and burns the off-gas to heat the low temperature reaction unit 12 to a temperature under 200° C., which is lower than the temperature by the high temperature combustor 16, for example, within a range of from about 110° C. to 190° C. The high temperature heater 18 heats the high temperature reaction unit 11 at a start instead of the high temperature combustor 16, and the low temperature heater 19 heats the low temperature reaction unit 12 instead of the low temperature combustor 17 at a start.

FIG. 2 is a perspective view showing the reactor 10. The reaction equipment 10 is housed in a heat insulating package 20. A gap is formed between the inner side surface and the outer side surface of the heat insulating package 20 with a not shown spacer between the surfaces. Moreover, the inner space of the heat insulating package 20 is kept to be a low pressure (0.03 Pa or less) in order to maintain a heat insulating effect, and the heat loss from the reactor 10 to the outside of the heat insulating package 20 is suppressed. A little gas exists in the inner space of the heat insulating package 20. As the gas, rare gases such as argon gas and helium gas, which are inert in a temperature range of the high temperature reaction unit 11 and the low temperature reaction unit 12, are preferable, but the gas is not to the rare gases.

As the material of the heat insulating package 20, for example, metal plates such as stainless (SUS 304) can be used. Moreover, in order to suppress the heat loss by the radiation from the reactor 10, a radiation prevention film is formed on the inner surface of the heat insulating package 20. For example, gold (Au) and the like can be used as the radiation prevention film.

As shown in FIG. 2, in the reactor 10, the high temperature reaction unit 11 and the low temperature reaction unit 12 are provided in the state of being separated from each other. In addition, it is preferable that radiation prevention films similar to the one provided on the inner surface of the heat insulating package 20 are formed on the outer peripheral surfaces of the high temperature reaction unit 11 and the low temperature reaction unit 12.

Figure 4:
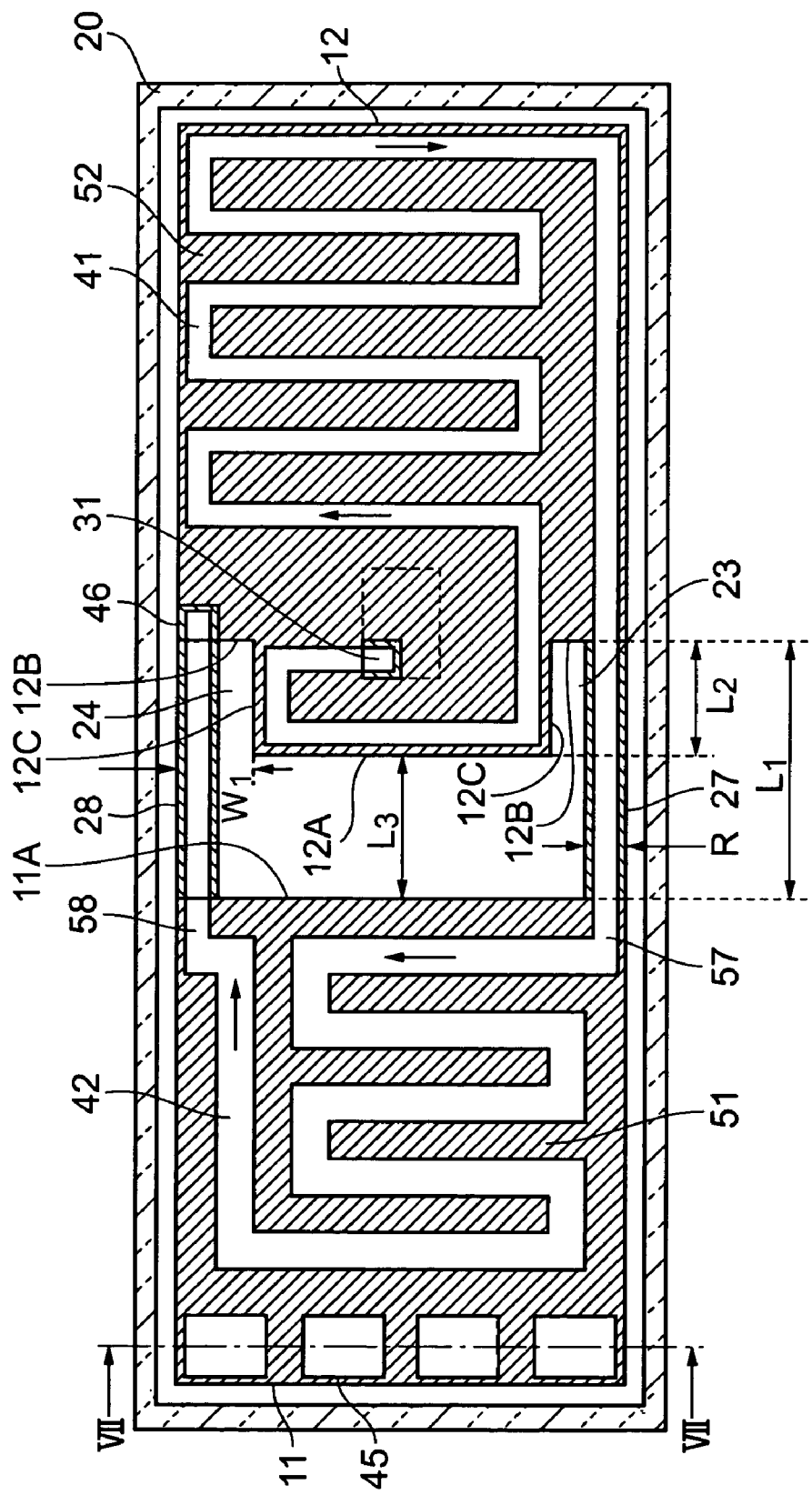
FIG. 4 is a sectional view viewed from the arrow direction, taken on line IV-IV of FIG. 2.
Figure 5:
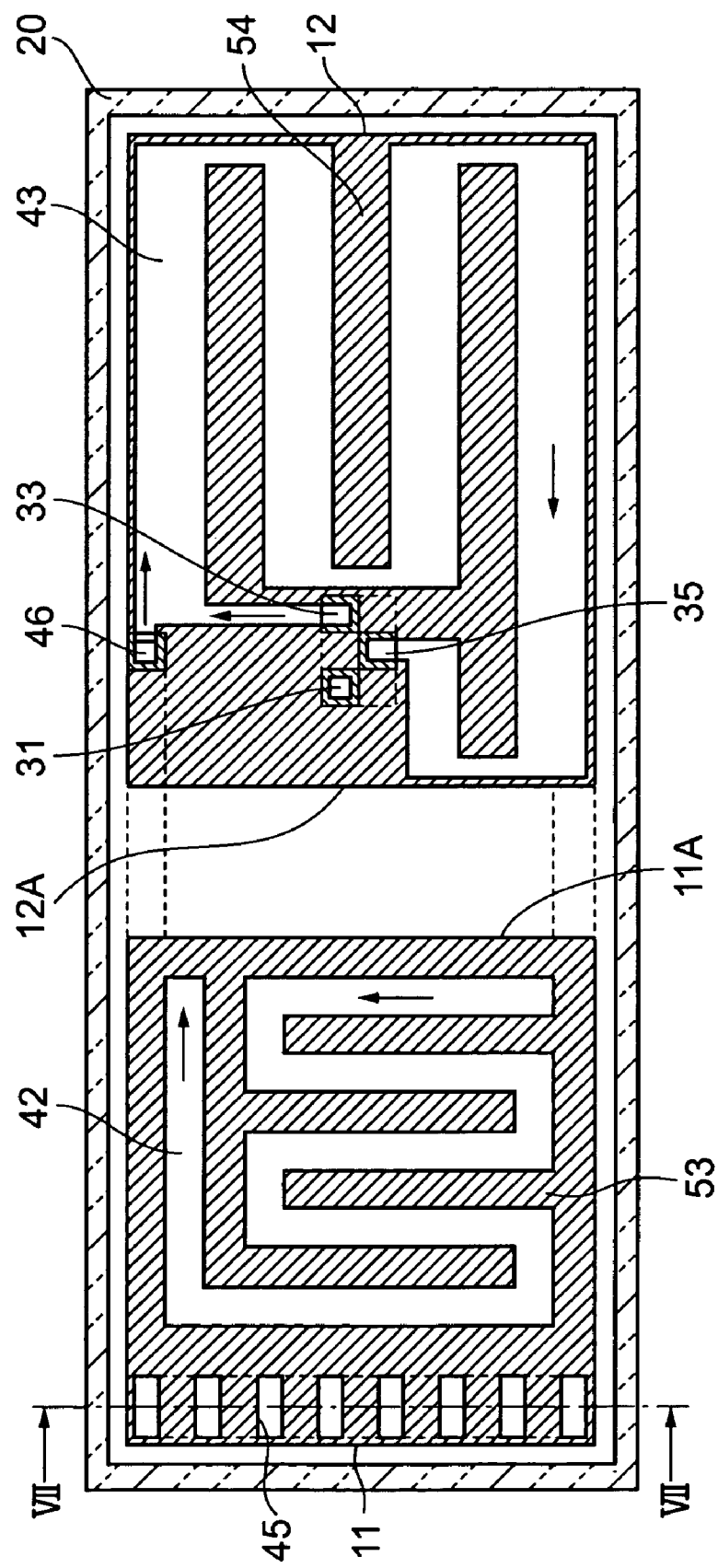
FIG. 5 is a sectional view viewed from the arrow direction, taken on line V-V of FIG. 2.
Figure 6:
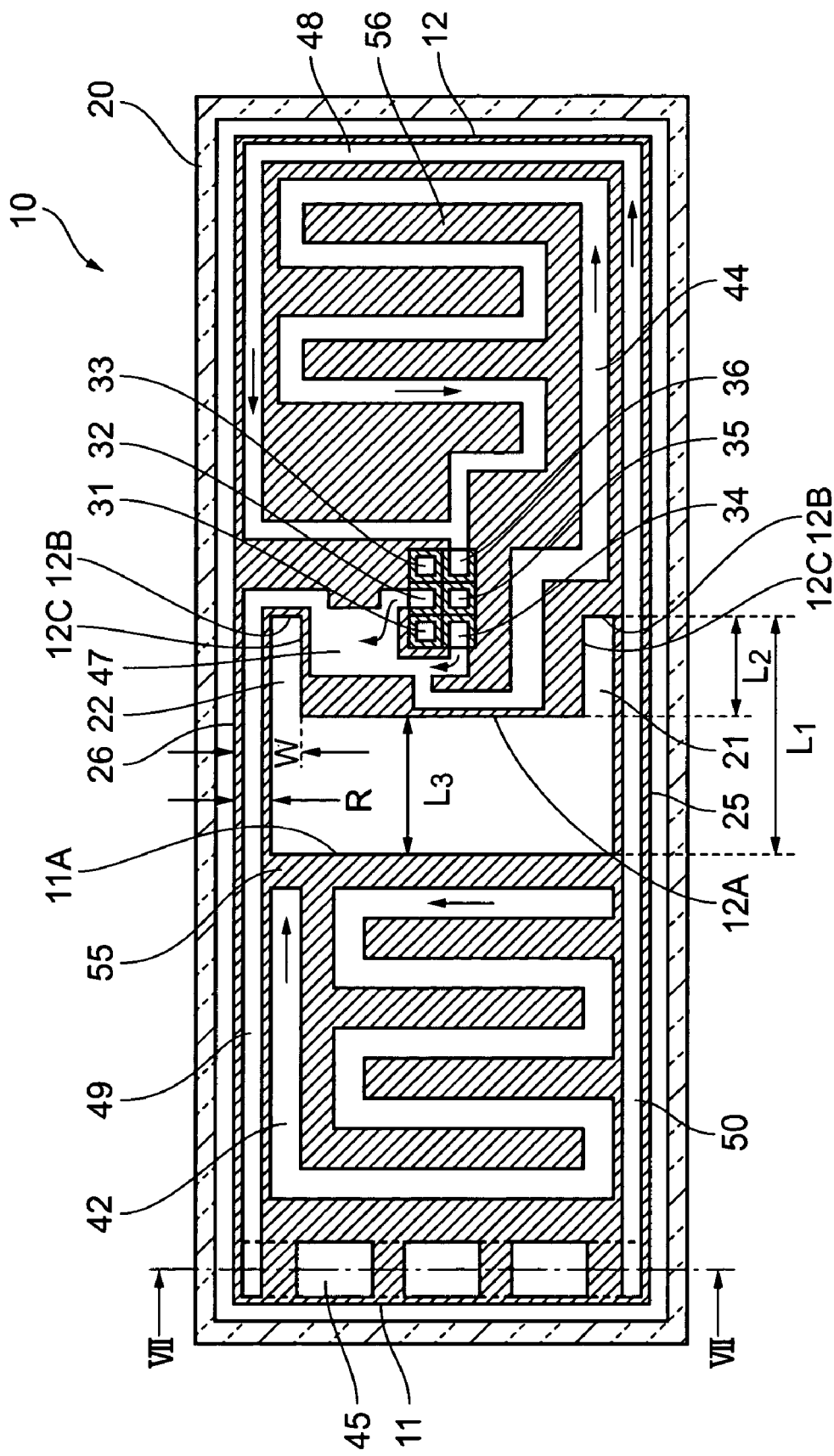
FIG. 6 is a sectional view viewed from the arrow direction, taken on line VI-VI of FIG. 2.

As shown in FIGS. 4-6, the low temperature reaction unit 12 includes three layers which are an upper layer metal substrate 52 provided with a vaporizing flow path 41, which is the vaporizer 13, an intermediate layer metal substrate 54 provided with a CO removal flow path 43, which is the CO remover 15, and a lower layer metal substrate 56 provided with a combustion flow path 44, which is the low temperature combustor 17. The low temperature reaction unit 12 has the structure in which these metal substrates 52, 54 and 56 are laminated. Moreover, if the vaporizing flow path 41 is opened, a metal substrate used as a top cover for sealing the opening is provided. If the combustion flow path 44 is opened, a metal substrate used as a bottom cover for sealing the opening is provided. As each of these metal substrates, metal substrates made of stainless (SUS 304) can be used.

The low temperature reaction unit 12 also includes a projecting surface 12A and a concave surface 12B so that they may be opposed to a flat opposed surface 11A of the high temperature reaction unit 11. The projecting surface 12A of the low temperature reaction unit 12 is projected towards the opposed surface 11A of the high temperature reaction unit 11 compared with the concave surface 12B. At the four corners of the end side of the projecting surface 12A, specifically two positions of each of the metallic plates 52 and 56, notches (recessed portions) 21, 22, 23 and 24 are formed. By the notches 21, 22, 23 and 24, each concave surface 12B faces to the opposed surface 11A of the high temperature reaction unit 11 to be opposed. Each concave surface 12B exposed by the four notches 21, 22, 23 and 24 is made to communicate with the flow path in the low temperature reaction unit 12, and are connected with communicating tubes 25, 26, 27 and 28, which are four linear pipes, respectively. Moreover, by the notches 21, 22, 23 and 24, the side surfaces 12C are exposed between the side surface projecting surface 12A and the concave surface 12B. The ends of the other sides of the four communicating tubes 25, 26, 27 and 28 are connected to the four corners of the end of the opposed surface 11A of the high temperature reaction unit 11. The length L1 of the four communicating tubes 25, 26, 27 and 28 between the opposed surface 11A of the high temperature reaction unit 11 and the concave surface 12B of the low temperature reaction unit 12 is the sum of the length of the longitudinal direction of the notches 21, 22, 23 and 24 of the low temperature reaction unit 12, namely the length L2 between the projecting surface 12A and the concave surface 12B of the low temperature reaction unit 12, and the length L3 between the opposed surface 11A of the high temperature reaction unit 11 and the projecting surface 12A of the low temperature reaction unit 12. The lengths L1, L2 and L3 are set according to the proper temperature range of the high temperature reaction unit 11, the proper temperature range of the low temperature reaction unit 12, and the temperature difference of them.

Thus, because the communicating tubes 25, 26, 27 and 28 communicate with the high temperature reaction unit 11 on the opposed surface 11A, and communicate with the low temperature reaction unit 12 with each concave surface 12B formed by the notches 21, 22, 23 and 24, the length L1 of the communicating tubes 25, 26, 27 and 28 between the high temperature reaction unit 11 and the low temperature reaction unit 12 is inevitably longer than the length L3 between the opposed surface 11A of the high temperature reaction unit 11 and the projecting surface 12A of the low temperature reaction unit 12. Moreover, the outer diameters R of the four communicating tubes 25, 26, 27 and 28 are sufficiently smaller in comparison with the widths W and the heights H of the notches 21, 22, 23 and 24.

In addition, in the part of the low temperature reaction unit 12 enclosed by the notches 21, 22, 23 and 24, the flow path of the low temperature reaction unit 12 is formed.

It is preferable that the communicating tubes 25 and 26 are made of a material having a heat expansion coefficient in the neighborhood of the heat expansion coefficient of the material of the lower layer metal substrate 56. In particular, it is preferable that the communicating tubes 25 and 26 are made of the same material as that of the metal substrate 56, and that the communicating tubes 25 and 26 are integrally formed with the metal substrate 56. It is preferable that the communicating tubes 27 and 28 are made of a material having a heat expansion coefficient in the neighborhood of the heat expansion coefficient of the material of the upper layer metal substrate 52. In particular, it is preferable that the communicating tubes 27 and 28 are made of the same material as that of the metal substrate 52, and that the communicating tubes 27 and 28 are integrally formed with the metal substrate 52.

In the reactor 10 having such a structure, the principal plane opposed to the low temperature reaction unit 12 in the high temperature reaction unit 11 is the opposed surface 11A. The principal plane opposed to the high temperature reaction unit 11 in the low temperature reaction unit 12 is the projecting surface 12A. The space between the high temperature reaction unit 11 and the low temperature reaction unit 12 is a part of the space partitioned by the heat insulating package 20 housing the high temperature reaction unit 11 and the low temperature reaction unit 12 therein, and a low pressure heat insulating gas is filled in the space.

Therefore, the propagation of heat is relatively small between the opposed surface 11A, which is the principal plane opposed to the low temperature reaction unit 12 in the high temperature reaction unit 11, and the projecting surface 12A, which is the principal plane opposed to the high temperature reaction unit 11 in the low temperature reaction unit 12. Moreover, because the communicating tubes 25, 26, 27 and 28 are solids, their heat conductance is higher than that of the heat insulating gas. Consequently the main paths of heat transfer from the high temperature reaction unit 11 to the low temperature reaction unit 12 are four communicating tubes 25, 26, 27 and 28.

In order to make the capacity of the whole reactor 10 small, it is preferable to shorten the length L3 between the opposed surface 11A and the projecting surface 12A as much as possible. If the notches 21, 22, 23 and 24 are not provided in the low temperature reaction unit 12, the length of the communicating tubes 25, 26, 27 and 28 between the high temperature reaction unit 11 and the low temperature reaction unit 12 agrees with the length between the opposed surface 11A and the projecting surface 12A. If the length between the opposed surface 11A and the projecting surface 12A is shortened for miniaturization in such a structure, the length of the communicating tubes 25, 26, 27 and 28 between the high temperature reaction unit 11 and the low temperature reaction unit 12 also becomes short, and the heat of the high temperature reaction unit 11 becomes easy to propagate to the low temperature reaction unit 12. Consequently, it becomes difficult to maintain the temperature gradient between the high temperature reaction unit 11 and the low temperature reaction unit 12 in the proper temperature range.

On the contrary, in the present invention, even if the length L3 between the opposed surface 11A and the projecting surface 12A is made to be short as much as possible in order to miniaturize the rector 10, the lengths of the communicating tubes 25, 26, 27 and 28 between the high temperature reaction unit 11 and the low temperature reaction unit 12 can be made to be sufficiently long by setting the length L2 to be long. Consequently, the heat transfer from the high temperature reaction unit 11 to the low temperature reaction unit 12 can be suppressed by setting the path length (L1) of the heat transfer from the high temperature reaction unit 11 to the low temperature reaction unit 12 through the communicating tubes 25, 26, 27 and 28 to be sufficiently long. Thereby, the temperature difference between the high temperature reaction unit 11 and the low temperature reaction unit 12 can be easily maintained.

The high temperature reaction unit 11, the low temperature reaction unit 12 and the communicating tubes 25, 26, 27, and 28 were made of SUS 304. The size of the heat insulating package 20 was made to be 39 mm in length, 19 mm in width and 9.4 mm in height. The distance between the heat insulating package 20 and the high temperature reaction unit 11, and the distance between the heat insulating package 20 and the low temperature reaction unit 12 were severally made to be 1 mm. The internal pressure of the heat insulating package 20 was set to 0.03 Pa. The widths W, the heights H and the lengths L2 of the notches 21, 22, 23 and 24 were made to be 2.8 mm, 2.8 mm and 3 mm, respectively. The distance from the communicating tubes 25, 26, 27 and 28 to the side surface 12C was made to 2.3 mm. The lengths L1, the outer diameters R and the inner diameters of the communicating tubes 25, 26, 27 and 28 between the high temperature reaction unit 11 and the low temperature reaction unit 12 were made to 6 mm, 0.5 mm and 0.3 mm, respectively. The length L3 was made to 3 mm. Thus, it was able to maintain each of the high temperature reaction unit 11 and the low temperature reaction unit 12 to be at 124° C.

In addition, the positions where the notches 21, 22, 23 and 24, and the communicating tubes 25, 26, 27 and 28 are limited to the four corners. For example, they may be formed at the central part of the end surface on the side of the high temperature reaction unit 11. Moreover, instead of providing the notches 21, 22, 23 and 24 and the communicating tubes 25, 26, 27 and 28 on the low temperature reaction unit 12, they may be provided on the side of the high temperature reaction unit 11, or they may be provided on both of them. Moreover, the shapes of the notches 21, 22, 23 and 24 are not limited to the rectangle as shown in FIG. 2, but the shapes may be formed in a column.

Assembled pipes 30 used as flow paths of the fluids (fuel and water, oxygen (air), reformed gas, off-gas, and exhaust gas) which flow in and out from the outside are provided at the upper part of the low temperature reaction unit 12. The high temperature reaction unit 11 and the low temperature reaction unit 12 can be formed by pasting, for example, stainless (SUS 304) made metallic plates on which the flow paths which will be described later are formed. Moreover, the material similar to those of the high temperature reaction unit 11 and the low temperature reaction unit 12, for example, metals such as stainless (SUS 304) and the like, can be used as the materials of the communicating tubes 25, 26, 27 and 28 and the assembly piping 30.

Figure 3:
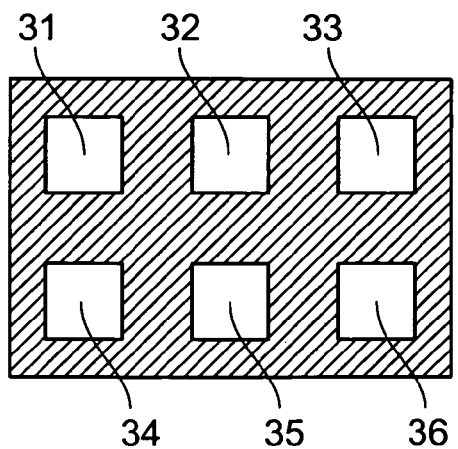
FIG. 3 is a sectional view viewed from the arrow direction, taken on line III-III of FIG. 2.

FIG. 3 is a horizontal sectional view of the assembly piping 30. As shown in FIG. 3, the assembly piping 30 is composed of the following components which are integrally formed to one body. The components are: a liquid fuel piping 31 for supplying a fuel containing water from the fuel container 101 to the vaporizer 13, an air supply piping 32 for supplying the air for combustion to the low temperature combustor 17, an air supply piping 33 for supplying the air (oxygen) for CO removal to the CO remover 15, an off-gas supplying pipe 34 for supplying the off-gas from a fuel cell 102 to the high temperature combustor 16 and the low temperature combustor 17, a reformed gas conveyance pipe 35 for supplying a reformed gas from the CO remover 15 to the fuel cell 102, and an exhaust pipe 36 for exhausting the exhaust gas generated when off-gas is burned in each of the high temperature combustor 16 and the low temperature combustor 17. The assembly piping 30 is formed to have the following sizes. That is, the outer diameter was formed to be 1.3 mm×0.9 mm. The inner diameters of each of the liquid fuel piping 31, the air supply piping 32, the air supply piping 33, the off-gas supply pipe 34, the reformed gas conveyance pipe 35 and the exhaust pipe 36 to be 0.3 mm×0.3 mm. The assembly piping 30 penetrates the heat insulating package 20, and is connected to the external fuel container 101, the fuel cell device 102, the not shown air pump and the like.

By concentrating the piping of fluids flowing in and out of the reactor 10 to provide the piping on the low temperature reaction unit 12, the area of the ping exposed to the outside decreases compared with the area of the separately provided piping, and the quantity of heat flowing out from the assembly piping 30 to the outside of the heat insulating package 20 can be decreased. Moreover, by assembling piping, the rigidity to a mechanical stress can be improved, and the distortion by heat stress can be decreased. Moreover, by limiting the flow out of the heat quantity to the outside of the heat insulating package 20 to the way from the low temperature reaction unit 12 without providing the piping connected to the outside of the heat insulating package, which is at remarkably low temperature than the temperature of the high temperature reaction unit 11 from the high temperature reaction unit 11, the heat loss can be further decreased.

In the following, the internal structure of the reactor 10 is described.

Figure 7:
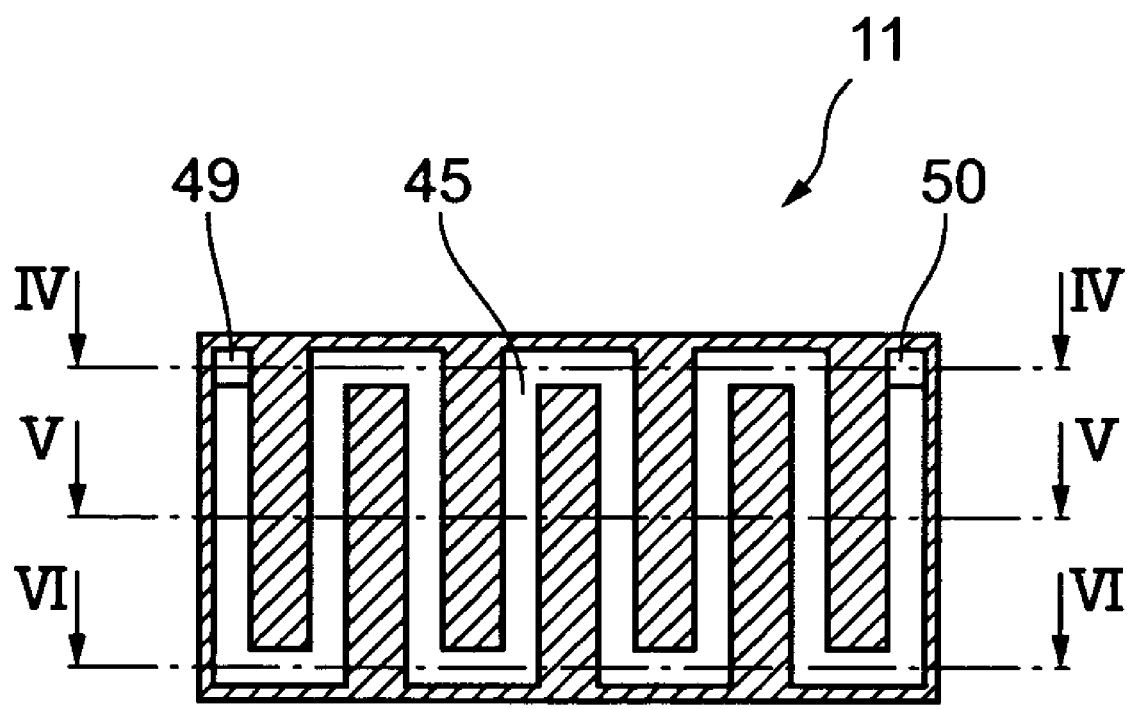
FIG. 7 is a sectional view viewed from the arrow direction, taken on line VII-VII of FIG. 2.

FIG. 4 is a sectional view viewed from the arrow direction at the time of horizontally cutting the high temperature reaction unit 11 and the low temperature reaction unit 12 along a cutting line IV-IV of FIG. 2. FIG. 5 is a sectional view viewed from the arrow direction at the time of horizontally cutting the high temperature reaction unit 11 and the low temperature reaction unit 12 along a cutting line V-V of FIG. 2. FIG. 6 is a sectional view viewed from the arrow direction at the time of horizontally cutting the high temperature reaction unit 11 and the low temperature reaction unit 12 along a cutting line VI-VI of FIG. 2. FIG. 7 is a sectional view viewed from the arrow direction at the time of vertically cutting the high temperature reaction unit 11 along a cutting line VII-VII of FIG. 2.

As shown in FIGS. 4-6, the high temperature reaction unit 11 is provided with the reformer 14 at a part near the low temperature reaction unit 12, and the high temperature combustor 16 on the opposite side. The reformer 14 and the high temperature combustor 16 have an upper layer metal substrate 51, a middle layer metal substrate 53 and a lower layer metal substrate 55, each made of a metal substrate such as stainless steel (SUS 304). A groove the upper side of which is opened is formed on the lower layer metal substrate 55. The groove is used as a reforming flow path 42 of the reformer 14. An aperture penetrating the middle layer metal substrate 53 is formed therein in the thickness direction thereof. The aperture is used as the reforming flow path 42 of the reformer 14. A groove the under side of which is opened is formed on the upper layer metal substrate 51. The groove is used as the reforming flow path 42 of the reformer 14. By laminating the upper layer metal substrate 51, the middle layer metal substrate 53 and the lower layer metal substrate 55, the grooves and the aperture are superposed on each other, and the reforming flow path 42 mutually communicating with the upper layer metal substrate 51, the middle layer metal substrate 53 and the lower layer metal substrate 55 is formed. In the upper layer metal substrate 51, a communicating groove 57 for communicating the reforming flow path 42 with a communicating tube 27 is formed at an end of the groove, and a communicating groove 58 for communicating the reforming flow path 42 with a communicating tube 28 is formed at the other end of the groove. Moreover, as shown in FIGS. 4-7, a combustion flow path 45, which is the high temperature combustor 16, is provided at an end distant from the low temperature reaction unit 12. The combustion flow path 45 is formed by the superposition of the through-holes formed in each of the upper layer metal substrate 51, the middle layer metal substrate 53, and the lower layer metal substrate 55. The groove used as a connection path 50 for communicating an end of the combustion flow path 45 with the communicating tube 25 of the combustion flow path 45 is formed in the lower layer metal substrate 55, and a groove used as a connection path 49 for communicating the other end of the combustion flow path 45 and the communicating tube 26 is formed in the lower layer metal substrate 55.

As shown in FIG. 4, the vaporizing flow path 41 is formed in a winding state in the metal substrate 52. The liquid fuel piping 31 of the assembly piping 30 is connected to an end of the vaporizing flow path 41 through the metal substrates 54 and 56, and the communicating tube 27 is connected to the other end thereof. An end of the communicating tube 27 is connected to the vaporizing flow path 41, and the other end thereof is connected to the reforming flow path 42. The reforming flow path 42 in the upper layer metal substrate 51, the middle layer metal substrate 53 and the lower layer metal substrate 55 is formed in a winding state. An end of the reforming flow path 42 is connected to the communicating tube 27 in the upper layer metal substrate 51, and other end thereof is connected to the communicating tube 28. A reforming catalyst working as the catalyst of the reforming reaction of either the chemical reaction formula (1) or (2) is provided in the reforming flow path 42. The reforming catalyst is a catalyst of, for example, copper/lead oxide series, and is made by carrying copper/lead oxide by alumina as a carrier.

An end of the communicating tube 28 is connected to the reforming flow path 42, and the other end of the communicating tube 28 is connected to a connection flow path 46 to the CO removal flow path 43 of the low temperature reaction unit 12. The connection flow path 46 penetrates the metal substrate 52, and communicates with the metal substrate 54 of the intermediate layer to connect the communicating tube 28 connected to the metal substrate 52 of the upper layer of the low temperature reaction unit 12 with the CO removal flow path 43 formed in the metal substrate 54.

As shown in FIG. 5, the CO removal flow path 43 is formed in a winding state in the metal substrate 54. One end of the CO removal flow path 43 is connected to the connection flow path 46 and the air supply piping 33, and other end thereof is connected to the reformed gas conveyance pipe 35. A CO removal catalyst which works as the catalyst of the oxidation reaction of the chemical reaction formula (3) is provided in the CO removal flow path 43. The CO removal catalyst is a catalyst of platinum series, and is made of carrying platinum, or platinum and ruthenium with alumina.

As shown in FIG. 6, a mixing flow path 47 and an exhaust flow path 48 are formed in the metal substrate 56 in the lower layer of the low temperature reaction unit 12 in addition to the combustion flow path 44 formed in the winding state.

An end of the combustion flow path 44 is connected to the mixing flow path 47, and the other end of the combustion flow path 44 is connected with the exhaust pipe 36. A combustion catalyst which works as the catalyst of the oxidation reaction of hydrogen in an off-gas is provided in the combustion flow path 44. The combustion catalyst is made of carrying platinum with alumina as a carrier.

The mixing flow path 47 is connected to the off-gas supplying pipe 34 and the air supply piping 32, and further is connected to the communicating tube 26 and the combustion flow path 44. The mixing flow path 47 mixes the off-gas with the air, and the mixing flow path 47 supplies the mixed gas to the communicating tube 26 and the combustion flow path 44 at a predetermined rate (for example, communicating tube 26: combustion flow path=1.37:1).

An end of the communicating tube 26 is connected to the mixing flow path 47, and the other end thereof is connected to the connection path 49 formed in the high temperature reaction unit 11 through the communicating tube 26. An end of the connection path 49 is connected to the communicating tube 26, and the other end thereof is connected to the combustion flow path 45.

The combustion flow path 45 is formed in a winding state as shown in FIG. 7. An end of the combustion flow path 45 is connected to the connection path 49, and the other end thereof is connected to the connection path 50. The combustion catalyst working as the catalyst of the oxidation reaction of fuel is provided in the combustion flow path 45. The combustion catalyst similar to that of combustion flow path 44 can be used as the combustion catalyst.

An end of the connection path 50 is connected to the combustion flow path 45, and the other end thereof is connected to the communicating tube 25. An end of the communicating tube 25 is connected to the connection path 50, and the other end thereof is connected to the exhaust flow path 48.

The exhaust flow path 48 formed on the metal substrate 56 is provide in the periphery of the lower layer so that the exhaust flow path 48 may enclose the combustion flow path 44. An end of the exhaust flow path 48 is connected to the communicating tube 25, and the other end thereof is connected with the exhaust pipe 36 together with the combustion flow path 44. Because the exhaust gas flowing through the exhaust flow path 48 is the gas exhausted from the high temperature combustor 16, the exhaust gas is at a relatively high temperature, and the exhaust gas also has the function of assisting the heating of the low temperature combustor 17.

In addition, the liquid fuel piping 31 penetrates the lower layer and the intermediate layer to communicate with the upper layer. Moreover, the air supply piping 33 and the reformed gas conveyance pipe 35 penetrate the lower layer to communicate with the intermediate layer.

In the following, the operation of the reactor 10 is described. First, a voltage is applied to the high temperature heater 18 and the low temperature heater 19, and the high temperature reaction unit 11 and the low temperature reaction unit 12 are heated to set temperatures, for example, a high temperature within a range of from 250° C. to 400° C. and a low temperature within a range of from 110° C. to 190° C., respectively.

When the temperatures of the high temperature reaction unit 11 and the low temperature reaction unit 12 have risen to the respective set temperatures, fuel and water are supplied to the vaporizing flow path 41 from the liquid fuel piping 31. When the fuel and the water are supplied, the vaporizing flow path 41 heats the fuel and the water to vaporize them. The vaporized fuel and the vaporized water flow into the reforming flow path 42 through the communicating tube 27.

In the reforming flow path 42, the vaporized fuel and the vaporized water are changed into a mixed gas composed of hydrogen gas, carbon dioxide gas and little carbon monoxide by the reforming reaction. The mixed gas generated by the reforming reaction flows into the CO removal flow path 43 through the communicating tube 28 and the connection flow path 46.

In the CO removal flow path 43, the oxygen supplied from the air supply piping 33 is mixed with the mixed gas, and the carbon monoxide slightly contained in the mixed gas is selectively oxidized. The mixed gas (reformed gas) from which the carbon monoxide has been removed is sent out from the reformed gas conveyance pipe 35 to the fuel cell device 102.

The unreacted off-gas in the introduced reformed gas for an electrochemical reaction on the fuel electrode side in the fuel cell device 102 is supplied from the off-gas supplying pipe 34 to the mixing flow path 47. In the mixing flow path 47, the off-gas is mixed with the air supplied from the air supply piping 32. The mixed gas of the off-gas and the air burns in the combustion flow path 44 while burning through the communicating tube 26 and the connection path 49 on the combustion flow path 45. The high temperature combustor 16 and the low temperature combustor 17 at this time can be controlled based on the flow rate of the off-gas, and the flow rate of the off-gas can be set by means of the widths and the depths of the flow paths of the combustion flow paths 44 and 45.

The exhaust gas of the combustion flow path 45 is discharged to the outside from the exhaust pipe 36 through the exhaust flow path 48 provided in the periphery of the low temperature reaction unit 12 in a manner of enclosing the connection path 50, the communicating tube 25 and the combustion flow path 44. The high-temperature exhaust gas which passes through the exhaust flow path 48 at this time can be used as a heat source of the low temperature reaction unit 12.

The exhaust gas of the combustion flow path 44 is discharged from the exhaust pipe 36 to the outside together with the exhaust gas of the combustion flow path 45.

When a sufficient heat quantity comes to be acquired by the combustion reaction in the combustion flow path 45, the operation of the high temperature heater 18 is stopped or the heating of the high temperature heater 18 is decreased to switch the main heat source of the high temperature reaction unit 11 to the combustion flow path 45.

When a sufficient heat quantity to heat the low temperature reaction unit 12 by the combustion reaction in the combustion flow path 44 and the high-temperature exhaust gas which passes through the exhaust flow path 48 comes to be acquired, the operation of the low temperature heater 19 is stopped or the heat generation of the low temperature heater 19 is decreased to switch the main heat source of the low temperature reaction unit 12 to the combustion flow path 44. After that, electric power can be continuously generated by continuing to supply fuel, water and air to the reactor.

In addition, the fuel and the oxygen may be supplied only from the liquid fuel piping 31 to the flow path 44 and the combustion flow path 45.

Moreover, the high temperature combustor 16 and the low temperature combustor 17 may be made to generate heat by combining the fuel and the off-gas. In this case, the fuel or the off-gas may be distributed to the combustion flow paths 44 and 45 at a predetermined rate from the liquid fuel piping 31 or the off-gas supply pipe 34 according to the internal flow path structure, and the air may be distributed to the combustion flow paths 44 and 45 from the air supply piping 32.

In the above embodiments, although methanol is used as the fuel, the fuel is not limited to the methanol, but compounds containing hydrogen atoms of alcohols such as ethanol and the like, gasoline and the like can be used in place of the methanol. In addition, it is of course that the combustion catalyst and the reforming catalyst can also be changed suitably.

The present U.S. patent application claims a priority under the Paris Convention of Japanese patent application No. 2005-169188 filed on Jun. 9, 2005, which shall be a basis of correction of an incorrect translation.

What is claimed is:

1. A reactor, comprising:
    a low temperature reaction unit which causes a reaction at a predetermined temperature, the low temperature reaction unit including a CO remover;
    a high temperature reaction unit which causes a reaction of a fuel at a higher temperature than the low temperature reaction unit, the high temperature reaction unit being provided separately from the low temperature reaction unit with a space therebetween, and the high temperature reaction unit including a reformer to reform the fuel into hydrogen; and
    a communicating tube via which the low temperature reaction i0 unit and the high temperature reaction unit communicate with each other;
    wherein at least one of the low temperature reaction unit and the high temperature reaction unit has a first surface, and the other of the low temperature reaction unit and the high temperature reaction unit has a second surface which is opposed to the first surface with the space therebetween;
    wherein the first surface comprises a concave surface and a projecting surface which projects towards the second surface, and
    a length between the concave surface and the second surface is longer than a length between the projecting surface and the second surface; and
    wherein the communicating tube is provided between the concave surface and the second surface.

2. The reactor according to claim 1, wherein the low temperature reaction unit includes a vaporizer.

3. The reactor according to claim 1, wherein the low temperature reaction unit includes a heater.

4. The reactor according to claim 1, wherein the high temperature reaction unit includes a heater.

5. The reactor according to claim 1, further comprising a heat insulating package to house therein the low temperature reaction unit, the high temperature reaction unit, and the communicating tube.

6. The reactor according to claim 1, wherein the low temperature reaction unit comprises a plurality of metal substrates.

7. The reactor according to claim 1, wherein the high temperature reaction unit comprises a plurality of metal substrates.

8. The reactor according to claim 1, wherein the low temperature reaction unit, the high temperature reaction unit and the communicating tube are formed of the same material.

9. The reactor according to claim 1, wherein:
    the communicating tube includes a piping to circulate a gas reformed by the reformer of the high temperature reaction unit into the CO remover of the low temperature reaction unit.

10. The reactor according to claim 1, wherein the high temperature reaction unit includes a combustor to combust a combustible gas to generate heat, and the communicating tube includes a piping to circulate the combustible gas from the low temperature reaction unit into the combustor.

11. The reactor according to claim 1, wherein the low temperature reaction unit includes an assembly piping.

12. A power generation apparatus equipped with the reactor according to claim 1.

* * * * *